Patented Jan. 29, 1952

2,583,558

UNITED STATES PATENT OFFICE 2,583,558

OCTAGLYCINE DIHYDROHEPTIODIDE AND METHODS OF MAKING THE SAME

Walter S. Frost, Somerville, Mass., assignor, by mesne assignments, to Morgan-Sabalol Products, Inc., New York, N. Y., a corporation of New York No Drawing. Application September 10, 1949, Serial No. 115,114

9 Claims. (Cl. 260—534)

This invention relates to the preparation of chemical compounds containing hydriodic acid, iodine and amino acids, especially glycine, which have the property of releasing free iodine when they are added to solvents, particularly water.

It is an object of this invention to provide products of this type and processes for their manufacture.

While chemical union of hydriodic acid, iodine and glycine into one or more true chemical entities must occur in the manufacture of a water sterilizing agent which I call Bursoline and on which I have patent pending (U. S. Patent Office application Number 558,972), an elucidation of the chemical composition and properties of such chemical entity or entities does not detract in any way from the value of the Bursoline composition but does make possible the manufacture of any such chemical entity or entities and analogous compounds free from any other, if desired, or improvements in such manufacture, as well as the choice of any one or more of them, free, if desired from excess of any of their constituents, and, if wanted, free of any other substance, to the end that a selection may be made of any or either of them or mixture thereof, in order that their special properties such as stability, solubility, solution rate, preferred iodine content, etc. may be selected for the improvement of water sterilizing or purifying agents, disinfecting or germicidal agents, pharmaceutical preparations and the like or for the manufacture of new and novel ones, such as capsule or tablet internal iodine medications or prepared solid forms for the treatment of cuts, abrasions, insect bites, etc. In general, the especial value of octaglycine dihydroheptiodide particularly, and such related compounds as are represented by the formula $(Cr_2NR_2COOH)_8 \cdot (HI)_2 \cdot I_5$ where R is hydrogen or a monovalent organic radical, is due to the combination of (1) very low vapor pressure of free iodine as compared with iodine itself, thus contributing to their stability when exposed to the air, and (2) to their ability to liberate free elemental iodine when added to solvents, particularly water.

In general, my present process comprises reacting hydriodic acid and iodine with a substance selected from the group glycine and substituted glycine having the type formula $CR_2NR_2COOH$ where R is hydrogen or a monovalent organic radical, in such a manner and in such proportions as to form octaglycine (or substituted octaglycine) dihydroheptiodide of the general formula $(CR_2NR_2COOH)_8 \cdot (HI)_2 \cdot I_5$ but particularly the glycine derivative, $(CH_2NH_2COOH)_8 \cdot (HI)_2 \cdot I_5$.

Octaglycine dihydroheptiodide is a solid crystallizing in flat needles (blades) with a brassy-bronze metallic luster in reflected light and steel gray in powdered form with a melting point of 162° C. to 167° C. Decomposition occurs at the melting point. The observed melting point is lower with slow than with fast heating. The compound is stable indefinitely when bottled in an inert container and shows only about five per cent of its iodine lost on exposure of several weeks to the air at room temperature. On being added to water and to other solvents it releases five equivalents (five gram atomic weights) of free iodine from one gram molecular weight of the compound.

This type of compound can be made from hydriodic acid, iodine and glycine (or substituted glycine) or from diglycine hydriodide $$(CH_2NH_2COOH)_2 \cdot HI$$

(or substituted diglycine hydriodide), iodine and glycine (or substituted glycine). The manufacture of such compounds can be carried out by the interaction of iodine and intimate mixtures of glycine (or substituted glycine) and diglycine hydriodide (or substituted diglycine hydriodide) in the absence of any solvent. They may also be manufactured in any suitable solvent, for example, water or glacial acetic acid, with crystallization therefrom. Water is a preferred solvent.

Optimum proportions for the manufacture of the pure compounds in the absence of any solvent are those represented by the stoichiometric proportions, namely two molecular weights of diglycine hydriodide (or substituted diglycine hydriodide), five atomic weights of iodine and four molecular weights of glycine (or substituted glycine). Reasonable purity of the finished compound can be obtained by slight departures from the stoichiometric proportions. The ingredients other than the iodine should be finely divided, such as by grinding and passing through an 80 mesh sieve, and may be intimately mixed before incorporating the iodine. The iodine will react if added in coarse crystals but will react more rapidly if more finely divided. If ground too fine it becomes troublesome on account of lumping. Passing through a 40 mesh sieve is satisfactory. The rapidity of the reaction is a function of the fineness of subdivision of the ingredients, the finer the more rapid the reaction. Rapid mixing also accelerates the reaction as also does a moderate rise in temperature above room temperature.

As an example of a now preferred process using this method 556 grams of diglycine hydriodide and 300 grams of glycine are ground together and pass through an 80 mesh sieve and 635 grams of iodine, through a 40 mesh sieve, are added to the mixture in a closed container and thoroughly mixed with it. Compound formation starts at once and the brassy glitter of crystals of octaglycine dihydroheptiodide can be seen in a day or two. Occasional further mixing is practiced and up to about two weeks are allowed for the reaction. Storage is in enclosed, preferably inert, containers.

A somewhat similar method of manufacture is to warm and dissolve or partially dissolve and suspend a desired amount of diglycine hydriodide (or substituted diglycine hydriodide) in its own weight (or somewhat less) of water and add it to the stoichiometric equivalent of glycine (or substituted glycine) finely divided or dissolved, mix thoroughly, evaporate off the water, dry, grind and pass through a fine (say 80 mesh) screen before adding the stoichiometric equivalent of iodine preferably passed through a 40 mesh screen, mix thoroughly and let stand as above. A variation of this method is to mix two equivalents of glycine (or substituted glycine) with one of hydriodic acid, adjusting the water content and temperature to effect complete solution and add to the stoichiometric equivalent of glycine (or substituted glycine), finely divided or dissolved, and proceed as just specified. Such admixtures with iodine and the octaglycine dihydroheptiodide are stored in closed, preferably inert, containers.

Since iodine is lost by evaporation of their solutions in the open, octaglycine dihydroheptiodide and related compounds may be made, using solvents, particularly water, by cooling their saturated solutions in closed containers, employing such excess of one or more of their constituents, glycine (or substituted glycine), hydriodic acid or iodine, as is desired, particularly an excess up to about 100 per cent of glycine (or substituted glycine), in making such saturated solutions, resulting in the crystallization of the desired compound. In all cases it is possible to use diglycine hydriodide instead of the molar equivalent of hydriodic acid and the two moles of glycine which correspond to each mole of hydriodic acid, and substituted diglycine hydriodide instead of the molar equivalent of hydriodic acid and the two moles of substituted glycine which correspond to each mole of it. Such compounds can also be conveniently made, using solvents, by adding the several constituents in stoichiometric ratio—or with such excess of one or more than one of them as desired, particularly with an excess up to about 100 per cent of glycine (or substituted glycine)—to an amount of solvent, particularly water, which becomes supersaturated when the ingredients react, with subsequent crystallization of the compound and removal from the solution after adjusting the temperature to about room temperature or below.

As an example of a now preferred method for making octaglycine dihydroheptiodide by cooling a saturated solution, a solution of 139 grams of diglycine hydriodide (or the equivalent in glycine and hydriodic acid) in 1000 milliliters of water is placed in a wide-mouthed ground glass stoppered bottle with 225 grams of glycine and 80 grams of iodine which has been passed through a 40 mesh sieve, heated in a water bath to 70° C. and shaken well. After slow cooling and filtering in a suction filter and drying the crystals either at room temperature or with gentle heating, brassy glistening blade-shaped crystals of the compound are obtained, melting point, 162° C. to 167° C.

In a now preferred method for the manufacture of octaglycine dihydroheptiodide using a solvent and at about or below room temperature, 139 grams of diglycine hydriodide (or the equivalent in glycine and hydriodic acid) with 225 grams of glycine are added to 750 milliliters of water at about or below room temperature and stirred during the addition of 159 grams of iodine which has been passed through a 40 mesh sieve. The compound begins to precipitate immediately. The mixture is stirred occasionally until the particles of iodine have disappeared and the temperature is adjusted to about room temperature. Two or three hours are usually sufficient for the particles of iodine to disappear. The small brassy glistening blade-shaped crystals of octaglycide dihydroheptiodide are filtered in a suction filter and dried either at room temperature or with gentle heating. Their melting point is 162° C. to 167° C. Smaller crystals are obtained by this method than by cooling the saturated solution.

I claim:

1. The process for the preparation of a compound containing hydriodic acid, iodine and glycine comprising intimately mixing diglycine hydriodide, iodine and glycine, in the proportion of two molecular weights of diglycine hydriodide, five atomic weights of iodine and four molecular weights of glycine, permitting reaction of said substances with the formation of a reaction product containing per gram molecular weight, two gram molecular weights of hydriodic acid, five gram atomic weights of iodine and eight gram molecular weights of glycine.

2. The process for the preparation of a compound containing hydriodic acid, iodine and glycine comprising intimately admixing two molecular weights of diglycine hydriodide, five atomic weights of iodine and four molecular weights of glycine, permitting reaction of said substances in the absence of solvents with the formation of octaglycine dihydroheptiodide.

3. In a process for the preparation of a compound containing diglycine hydriodide, iodine and glycine the steps which comprise intimately admixing the ingredients in the form of diglycine hydriodide which has been passed through an 80 mesh sieve, iodine which has been passed through a 40 mesh sieve and glycine which has been passed through an 80 mesh sieve, permitting reaction of said substances in the absence of solvents with the formation of a reaction product containing per gram molecular weight, two gram molecular weights of diglycine hydriodide, five gram atomic weights of iodine and four gram molecular weights of glycine.

4. In a process for the preparation of a compound containing hydriodic acid, iodine and glycine the steps which comprise intimately admixing in stoichiometric ratio the ingredients in the form of diglycine hydriodide, iodine and glycine, permitting reaction of said substances in the absence of solvents with the formation of a reaction product containing per gram molecular weight, two gram molecular weights of hydriodic acid, five gram atomic weights of iodine and eight gram molecular weights of glycine.

5. The process for preparing octaglycine dihydroheptiodide which comprises cooling a saturated solution of the compound made by interaction of about eight to about sixteen molecular weights of glycine, two molecular weights of hydriodic acid and about two to about five atomic weights of iodine with subsequent crystallization of the octaglycine dihydroheptiodide.

6. The method of making octaglycine dihydroheptiodide which comprises adding enough hydriodic acid which may be in the form of diglycine hydriodide, together with glycine and iodine, to give the ratio of about eight to about sixteen molecular weights of glycine, two molecular weights of hydriodic acid and about two to five atomic weights of iodine to such an amount of a member of the group consisting of water and other solvent that the solution at about room temperature or below becomes supersaturated with respect to octaglycine dihydroheptiodide and the substance crystallizes out.

7. A method for manufacturing octaglycine dihydroheptiodide consisting of adding about eight to about sixteen molecular weights of glycine, two molecular weights of hydriodic acid, which may be in the form of diglycine hydriodide, and about two to about five atomic weights of iodine to an amount of water at about room temperature or below which becomes supersaturated with octaglycine dihydroheptiodide and the latter precipitates.

8. As a new product $$(CH_2NH_2COOH)_8 \cdot (HI)_2 \cdot I_5$$

9. As a new product, octaglycine dihydroheptiodide, being a compound which exists at flat crystalline needles or blades that have a brassy color in reflected light, a steel gray color when finely divided, has a melting point of 162° C. to 167° C., a very low vapor pressure of free iodine as compared with iodine itself and which liberates free iodine in the ratio of five gram atomic weights of iodine to each gram molecular weight of the compound when the compound is added to water.

WALTER S. FROST.

REFERENCES CITED

The following references are of record in the file of this patent:

Pfeiffer, Beilstein (Handbuch, 4th ed.) 2d suppl., pages 779–784 (1942).